Patented May 14, 1946

2,400,463

UNITED STATES PATENT OFFICE 2,400,463

METHOD OF PRODUCING TRICHLOROPROPIONIC ACID

Joy G. Lichty, Stow, Ohio, assignor to Wingfoot Corporation, Akron, Ohio, a corporation of Delaware No Drawing. Application April 29, 1942, Serial No. 440,926

2 Claims. (Cl. 260—539)

This invention relates to the preparation of trihalopropionic acid and trihalopropionamide by hydrolysis of trihalopropionitrile. The hydrolysis is carried out in an acid solution. The invention will be described more particularly as applied to the chloro compounds although the bromo and iodo compounds may be prepared in the same way.

The following examples are illustrative of the process and although sulfuric acid has been employed in the example, other acid media may be used.

Alpha dichloro beta chloro propionic acid

A reaction vessel is equipped with a stirring device and a reflux condenser. Twenty mols of concentrated sulfuric acid are introduced into the reaction vessel. Forty mols of water are added rapidly, the acid being stirred meanwhile. The diluted acid is then brought to a temperature of 140–155° C. and ten mols of trichloro propionitrile are added gradually at such a rate that the temperature is maintained at a temperature above 140° C., e. g. a temperature between 145–150° C. by the heat of the exothermic reaction. If the temperature is maintained between 145–150° C. the addition of nitrile should consume about one and a half to two hours. When the whole of the nitrile has been added, the mixture is maintained at an elevated temperature to complete the reaction, e. g. at 140–150° C. for about four hours longer.

Then the mass is allowed to cool down to cause separation of the crude trichloro propionic acid from the aqueous solution of ammonium bisulfate. It may, for example, be cooled to about 80° C. The aqueous solution is heavier than the acid. At temperatures below about 75° C. the entire mass tends to crystallize and this, of course, is to be avoided.

The crude acid which is thus separated is distilled until the boiling point rises to about 120° C./60 mm. The residue consists of practically pure alpha dichloro beta chloro propionic acid and for some purposes may be used as such. The acid may, if preferred, be further purified by distillation. It has a boiling point of approximately 140° C./40 mm. The yield as undistilled chloro propionic acid is practically quantitative. The yield of the distilled product is about 93%.

The preferred temperature referred to in the example gives rapid and substantially complete conversion. A lower temperature, for example any temperature above 120° C., may be used but at this temperature the acid should be heated for a longer time. Furthermore, the concentration of the acid may be varied and other mineral acids, such as hydrochloric, phosphoric, etc. may be used. Under the conditions of the above example, a ratio of one part of nitrile to ten parts of water to 2 parts of sulfuric acid gave only a small yield of trichloro propionic acid when heated at 120–125° for six hours. For most satisfactory results a concentration of at least 50% of sulfuric acid should be employed.

It is also possible to hydrolyze trichloropropionitrile to trichloropropionamide as set forth below.

Alpha dichloro beta chlor propionamide

Twenty four parts by weight of dry hydrochloric acid gas was passed into a solution of 95.3 parts of trichloropropionitrile in 67 parts of anhydrous isobutyl alcohol. The solution became viscous. After a period of time water was added to the product. The lower layer was removed and the more volatile ingredients were distilled off from it. A residue of 100.2 parts remained which set to a solid on cooling. This solid was alpha dichloro beta chloropropionamide. It has a melting point of about 57° C. The yield of crude product is 94%. Other inert organic solvents may be used. The trichloropropionamide gives a pattern when used as a crystallizing lacquer as disclosed in my application Serial No. 412,471, filed September 26, 1941.

I claim:

1. The one-step method of producing trichloropropionic acid which comprises gradually adding about one molecular part of trichloropropionitrile to a sulfuric acid bath formed by diluting about two molecular parts of concentrated sulfuric acid with about four molecular parts of water while stirring and maintaining the temperature of the bath at about 140–150° C. throughout the reaction until the nitrile is substantially completely converted to the acid.

2. A method of producing trichloropropionic acid which comprises hydrolyzing trichloropropionitrile in a sulfuric acid bath formed by diluting about 2 parts of concentrated sulfuric acid with about 4 parts of water at a temperature above about 120° C. until the nitrile is substantially completely converted to the acid.

JOY G. LICHTY.